(12) United States Patent
Kondo et al.

(10) Patent No.: US 8,100,344 B2
(45) Date of Patent: Jan. 24, 2012

(54) FUEL INJECTOR WITH FUEL PRESSURE SENSOR

(75) Inventors: Jun Kondo, Nagoya (JP); Akitoshi Yamanaka, Hekinan (JP)

(73) Assignee: Denso Corporation, Kariya (JP)

( * ) Notice: Subject to any disclaimer, the term of this patent is extended or adjusted under 35 U.S.C. 154(b) by 187 days.

(21) Appl. No.: 12/423,993

(22) Filed: Apr. 15, 2009

(65) Prior Publication Data

US 2010/0096480 A1 Apr. 22, 2010

(30) Foreign Application Priority Data

Apr. 15, 2008 (JP) ................................ 2008-106015
Jan. 20, 2009 (JP) ................................ 2009-009935

(51) Int. Cl.
*B67D 5/38* (2006.01)
(52) U.S. Cl. ........... 239/74; 239/533.2; 239/88; 239/71; 123/480; 73/114.51; 73/114.43
(58) Field of Classification Search ................. 239/584, 239/102.2, 88, 71, 533.2, 533.3, 533.7, 63, 239/68, 74; 123/480, 472, 435, 494, 456, 123/488, 490, 498, 468, 469, 457, 458, 459, 123/445, 510; 73/718, 114.51, 114.45, 114.43
See application file for complete search history.

(56) References Cited

U.S. PATENT DOCUMENTS

| | | | | |
|---|---|---|---|---|
| 3,675,722 A | * | 7/1972 | Balmes, Sr. | 169/30 |
| 3,698,249 A | * | 10/1972 | Weaver | 73/723 |
| 4,257,260 A | * | 3/1981 | Beatson et al. | 73/114.43 |
| 4,261,209 A | * | 4/1981 | Hatsuno et al. | 73/753 |
| 4,438,496 A | * | 3/1984 | Ohie | 701/104 |
| 4,461,182 A | * | 7/1984 | Jones et al. | 73/862.53 |
| 4,748,954 A | * | 6/1988 | Igashira et al. | 123/494 |
| 4,843,887 A | * | 7/1989 | Engeler et al. | 73/730 |
| 4,893,601 A | * | 1/1990 | Sugao | 123/468 |
| 4,964,389 A | * | 10/1990 | Eckert | 123/447 |
| 5,351,548 A | * | 10/1994 | Briggs et al. | 73/718 |
| 5,404,756 A | * | 4/1995 | Briggs et al. | 73/718 |
| 5,832,898 A | * | 11/1998 | Wakeman | 123/447 |
| 5,988,142 A | * | 11/1999 | Klopfer | 123/446 |
| 6,234,404 B1 | * | 5/2001 | Cooke | 239/88 |
| 6,276,610 B1 | * | 8/2001 | Spoolstra | 239/5 |

(Continued)

FOREIGN PATENT DOCUMENTS

JP S56-118553 9/1981

(Continued)

OTHER PUBLICATIONS

U.S. Appl. No. 12/265,743, Kondo et al., filed Nov. 6, 2008.

(Continued)

*Primary Examiner* — Dinh Nguyen
*Assistant Examiner* — Viet Le
(74) *Attorney, Agent, or Firm* — Nixon & Vanderhye PC

(57) ABSTRACT

A fuel injector which may be employed in injecting fuel into an internal combustion engine. The fuel injector includes an injector body and a head body formed to be separate from the injector body. The head body has installed therein a fuel pressure sensor working to measure the pressure of fuel in the fuel injector and is joined detachably to the injector body. The fuel injector alternatively includes an injector body and a fuel pressure-sensing unit equipped with a fuel pressure sensor. The fuel pressure-sensing unit is installed detachably on the injector body. This structure provides enhanced productivity of the fuel injector and facilitate the ease of replacement of the fuel pressure sensor.

20 Claims, 6 Drawing Sheets

U.S. PATENT DOCUMENTS

| | | | |
|---|---|---|---|
| 6,345,606 B1 * | 2/2002 | Ricci-Ottati et al. | 123/456 |
| 6,598,591 B2 * | 7/2003 | Lewis | 123/467 |
| 6,782,909 B1 * | 8/2004 | Ragless | 137/78.3 |
| 7,159,799 B2 * | 1/2007 | Cooke | 239/533.12 |
| 7,552,717 B2 * | 6/2009 | Dingle | 123/480 |
| 7,810,472 B2 * | 10/2010 | Kondo et al. | 123/456 |
| 7,878,052 B2 * | 2/2011 | Danby et al. | 73/114.49 |
| 7,900,605 B2 * | 3/2011 | Dingle | 123/480 |
| 2005/0034709 A1 * | 2/2005 | Augustin | 123/446 |
| 2006/0101904 A1 * | 5/2006 | Brock | 73/120 |
| 2006/0180122 A1 * | 8/2006 | Maekawa et al. | 123/299 |
| 2008/0202225 A1 * | 8/2008 | Munz et al. | 73/114.43 |
| 2009/0000595 A1 * | 1/2009 | Ashizawa et al. | 123/435 |
| 2009/0050114 A1 * | 2/2009 | Heinz et al. | 123/494 |
| 2009/0118981 A1 * | 5/2009 | Kondo et al. | 701/104 |
| 2009/0241650 A1 * | 10/2009 | Kondo et al. | 73/114.43 |
| 2009/0248276 A1 * | 10/2009 | Kondo et al. | 701/103 |
| 2009/0260598 A1 * | 10/2009 | Eisenmenger | 123/494 |
| 2010/0050991 A1 * | 3/2010 | Cooke | 123/470 |
| 2010/0096480 A1 * | 4/2010 | Kondo et al. | 239/584 |
| 2010/0263633 A1 * | 10/2010 | Kondo et al. | 123/478 |

FOREIGN PATENT DOCUMENTS

| | | | |
|---|---|---|---|
| JP | 57-005526 | | 1/1982 |
| JP | 57005526 A | * | 1/1982 |
| JP | 2000-241273 | | 9/2000 |
| JP | 2000-275128 | | 10/2000 |
| JP | 2001-324402 | | 11/2001 |
| JP | 2002-013994 | | 1/2002 |
| JP | 2002-013997 | | 1/2002 |
| JP | 2007-016678 | | 1/2007 |
| JP | 2007-154700 | | 6/2007 |
| JP | 2007-218249 | | 8/2007 |
| JP | 2007-231770 | | 9/2007 |
| JP | 2007-270822 | | 10/2007 |
| JP | 2007270822 A | * | 10/2007 |

OTHER PUBLICATIONS

U.S. Appl. No. 12/265,772, Kondo et al., filed Nov. 6, 2008.

U.S. Appl. No. 12/265,745, Kondo et al., filed Nov. 6, 2008.

* cited by examiner

FUEL INJECTOR WITH FUEL PRESSURE SENSOR

CROSS REFERENCE TO RELATED DOCUMENT

The present application claims the benefit of Japanese Patent Applications No. 2008-106015 filed on Apr. 15, 2008 and No. 2009-9935 filed on Jan. 20, 2009, disclosures of which are incorporated herein by reference.

BACKGROUND OF THE INVENTION

1. Technical Field of the Invention

The present invention relates generally to a fuel injector which may be employed in injecting fuel into an internal combustion engine, and more particularly to such a fuel injector which is equipped with a fuel pressure sensing mechanism secured integrally with a body of the fuel injector.

2. Background Art

Japanese Patent First Publication No. 2007-231770 discloses a common rail fuel injection system equipped with a pressure sensor working to measure the pressure of fuel to be injected into an internal combustion engine. The pressure sensor is installed in an end of a common rail to measure the pressure of fuel stored in the common rail. Typical fuel injectors for use in such a common rail injection system are taught in, for example, Japanese Patent First Publication Nos. 2007-270822 and 2007-218249.

Japanese Patent First Publication No. 57-5526 discloses a fuel injector in which a pressure sensor is installed. The fuel injector has a fuel flow path extending therein and a recess formed near the fuel flow path. The pressure sensor made of a strain gauge is affixed to the recess to measure a change in pressure of the fuel in the fuel flow path which has arisen from the spraying of the fuel from the fuel injector.

The systems taught in the above first to third publications, however, have a difficulty in determining the pressure of fuel supplied to each fuel injector.

The fuel injector, as taught in the above fourth publication, has the recess formed in an outer wall thereof near a lower portion of the fuel flow path. The pressure sensor is, as described above, provided in the recess. The fuel flow path is so formed as to extend through an injector body in an axial direction thereof. The formation of the recess is usually achieved by grinding the outer wall of the injector body. It is, therefore, difficult to control the thickness of the bottom wall (i.e., a diaphragm) of the recess precisely, which may result in a decrease in accuracy in determining the pressure of fuel or a change in pressure of the fuel. Fuel injectors, such as the ones in the first to third publications, designed to spray the fuel at high pressures are generally needed to have an injector body made of a high-hardness metal or an increased thickness of the wall of the fuel flow path in order to withstand the high-pressure fuel and thus have a pronounced problem with the difficulty in controlling the thickness of the diaphragm, in other words, ensuring a desired accuracy in measuring the pressure of fuel in the fuel injector.

SUMMARY OF THE INVENTION

It is, therefore, an object of the invention to provide a fuel injector which is equipped with a fuel pressure-sensing mechanism assembled integrally with a body of the fuel injector and designed to be have enhanced productivity and ensure a desired accuracy in measuring the pressure of fuel in the fuel injector.

It is another object of the invention to provide a fuel injector equipped with a fuel pressure-sensing mechanism which is easy to replace.

According to one aspect of the present invention, there is provided a fuel injector which may be employed with an accumulator fuel injection system such as a common rail fuel injection system for automotive diesel engines. The fuel injector comprises: (a) an injector body having a length with first and second end portions opposed to each other, the injector body also having a spray hole formed in the second end portion and a fuel flow path to which fuel is supplied externally and which communicates with the spray hole to spray the fuel; (b) a head body formed to be separate from the injector body, the head body being secured to the first end portion of the injector body; and (c) a fuel pressure sensor installed in the head body. The fuel pressure sensor includes a diaphragm communicating with the fuel flow path in the injector body and a sensing device. The diaphragm is exposed to the fuel so as to be deformed as a function of a pressure of the fuel. The sensing device produces a signal as a function of a degree of deformation of the diaphragm.

Specifically, the head body equipped with the fuel pressure sensor is installed on a portion of the injector body which is located far from the spray hole, thus facilitating the diagnosis of the operation of the fuel pressure sensor before the head body is fixed to the injector body. If a failure in the operation is found, it may be replaced easily, thereby improving the fabrication yield of the fuel injector.

In the preferred mode of the invention, the fuel injector further comprises a nozzle needle which is movable in an axial direction of the injector body to open and close the spray hole selectively, an actuator working to control movement of the nozzle needle in the axial direction of the injector body, and a pressure control chamber into or from which the fuel is fed or discharged by an operation of the actuator and which exerts pressure of the fuel, as fed thereinto, on a control piston to urge the nozzle needle in a valve-closing direction in which the spray hole is closed. The nozzle needle, the actuator, the control piston, and the pressure chamber are disposed in the injector body. The first end portion of the injector body to which the head body is joined is located farther from the spray hole than the pressure control chamber. This structure facilitates the laying out of signal conductors connecting with the sensing device in the head body.

The first end portion of the injector body has a first end surface, a recess formed in the first end surface to have a given depth, and a branch path which diverges from the fuel flow path and opens on a portion of the recess. The head body includes a base which has a fitting surface which is fitted to the first end surface and a protrusion which includes a portion of the fitting surface and is contoured to conform with contour of the recess. Specifically, the protrusion serves as a guide to guide the alignment of the head body with the injector body when the head body is joined to the injector body.

The base of the head body has an upper surface opposed to the fitting surface, a stem mount chamber extending from the upper surface toward the fitting surface to have a bottom from which an in-head path extends to the branch path, and a hollow cylindrical stem installed in the stem mount chamber. The stem has first and second ends opposed to each other. The first end is closed to define the diaphragm of the fuel pressure sensor. The second end opens into the in-head path. The stem mount chamber has a depth extending from the upper surface of the base into the protrusion of the base, so that the second end lies inside the protrusion.

The stem mount chamber has an internal thread. The stem having an external thread which engages the internal thread to install the stem in the head body.

The base of the head body may alternatively be designed to have an upper surface opposed to the fitting surface, a through hole extending from the upper surface to the fitting surface, and a hollow cylindrical stem installed in the through hole. The stem has first and second ends opposed to each other. The first end is closed to define the diaphragm. The second end communicates with the branch path. The first end portion of the injector body has formed in the first end surface a recess communicating with the through hole of the base to define a stem mount chamber along with the through hole. The stem is disposed in the stem mount chamber and has a portion secured to the recess.

The recess of the injector body has an internal thread. The stem has an external thread which engages the internal thread to install the stem in the injector body.

The first end portion of the injector body may be designed to have a first end surface and an extension extending around an edge of the first end surface. The head body may include a base with a fitting surface which is placed in surface abutment with the first end surface of the injector body and is partially so recessed as to be fitted to the extension of the injector body.

The first end portion of the injector body may have a first end surface, a chamber formed in the first surface to have a given depth with an internal thread, and a branch path extending from a portion of the chamber to the fuel flow path. The pressure sensor includes a hollow cylindrical stem installed in the chamber. The stem has first and second ends opposed to each other. The first end is closed to define the diaphragm. The second end opens into the branch path. The head body may include a base which has a fitting surface shaped to be fitted to the first end surface of the injector body and a stem through hole formed through the fitting surface in coincidence with the chamber to define a stem mount chamber. The stem is disposed in the stem mount chamber so that an upper end of the stem lies near an upper surface of the base which is opposed to the fitting surface.

The head body may be fastened to the injector body through a nut.

The fuel injector may further comprise a plurality of terminals disposed above a surface of the base of the head body. The terminals are electrically insulated from each other and connected to conductors disposed in the base. The sensing device has conductive wires connected to the terminals.

According to the second aspect of the invention, there is provided a fuel injector which comprises: (a) an injector body having a length with first and second end portions opposed to each other, the injector body also having a spray hole formed in the second end portion and a fuel flow path to which fuel is supplied externally and which communicates with the spray hole to spray the fuel; and (b) a fuel pressure-sensing unit designed to be separate from the injector body. The fuel pressure-sensing unit is secured to the first end portion of the injector body and includes a diaphragm communicating with the fuel flow path in the injector body and a sensing device. The diaphragm is exposed to the fuel so as to be deformed as a function of a pressure of the fuel. The sensing device produces a signal as a function of a degree of deformation of the diaphragm.

Specifically, the fuel pressure-sensing unit equipped with a fuel pressure sensor made up of the diaphragm and the sensing device is installed on a portion of the injector body which is located far from the spray hole, thus facilitating the diagnosis of the operation of the fuel pressure sensor before the head body is fixed to the injector body. If a failure in the operation is found, it may be replaced easily, thereby improving the fabrication yield of the fuel injector to enhance the productivity thereof.

In the preferred mode of the invention, the fuel pressure-sensing includes an amplifier which works to amplify an electric output of the sensing device.

The fuel pressure-sensing unit includes a bottomed hollow cylindrical stem which has first and second ends opposed to each other. The first end is closed by a bottom which defines the diaphragm. The second end communicates with the fuel flow path. The stem is installed in the first end portion of the injector body to retain the fuel pressure-sensing unit to the injector body.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
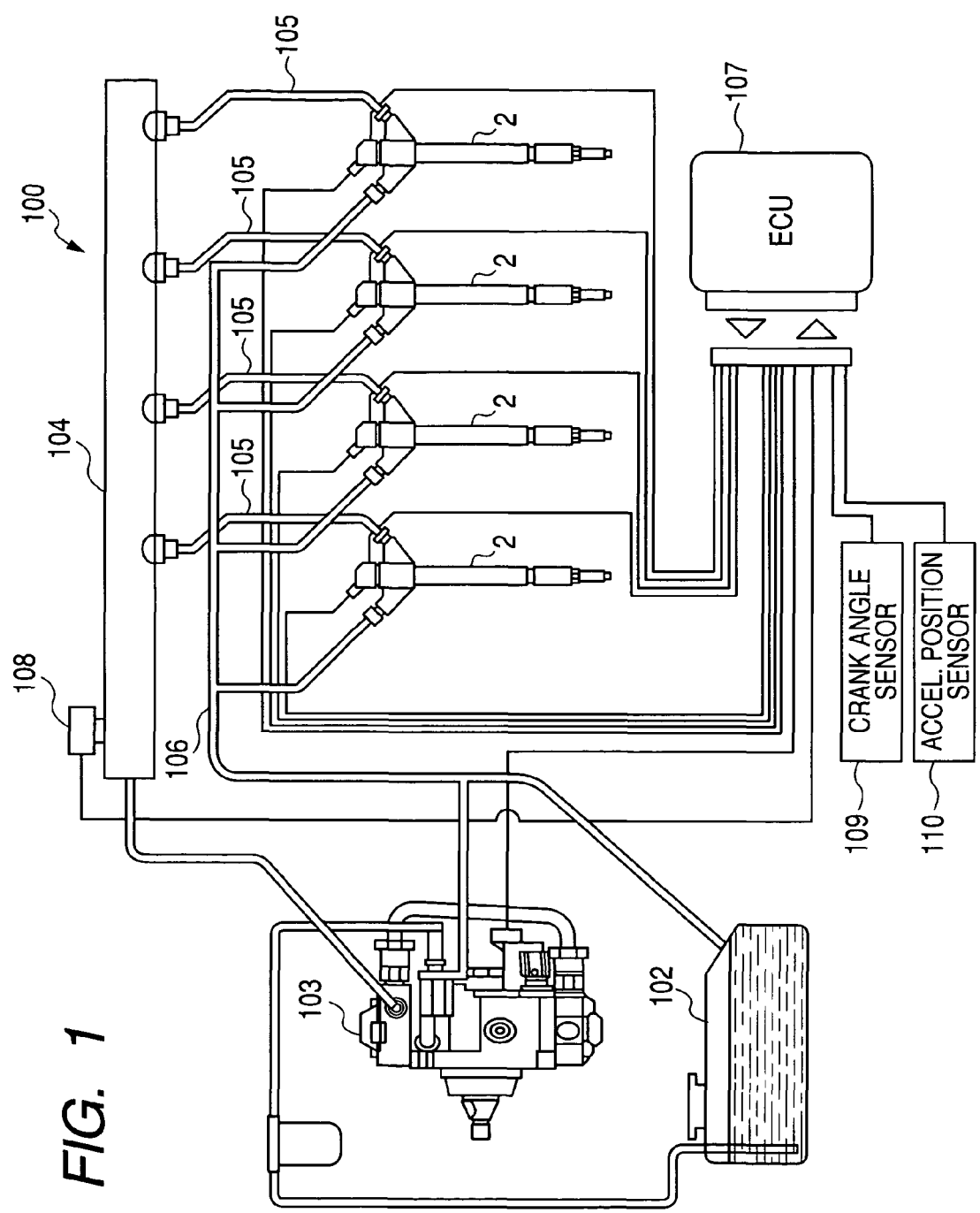
FIG. 1 is a schematic view which shows an accumulator fuel injection system equipped with fuel injectors according to the present invention.
Figure 2:
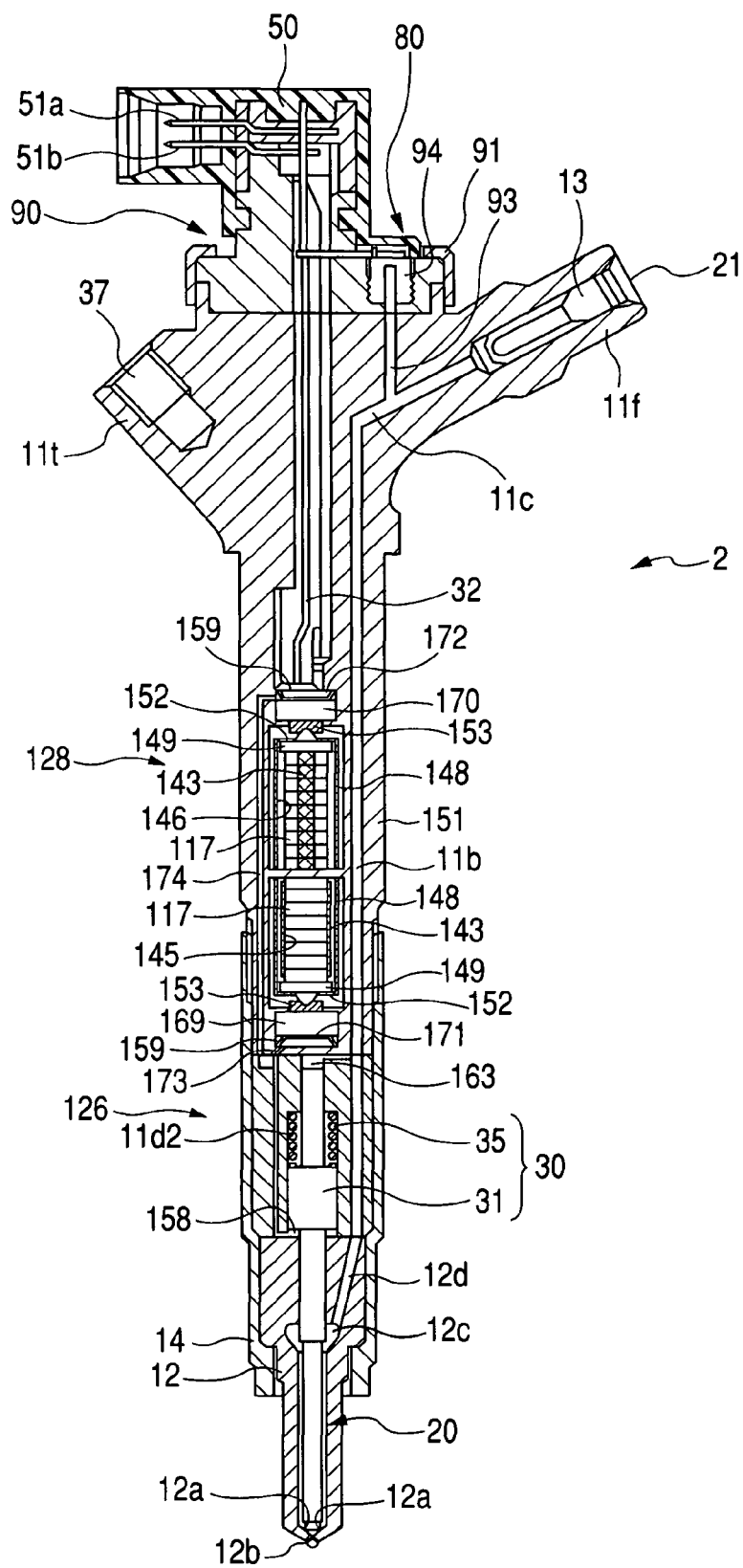
FIG. 2 is a longitudinal sectional view which shows an internal structure of each of the fuel injectors of FIG. 1.

Referring to the drawings, wherein like reference numbers refer to like parts in several views, particularly to FIG. 1, there is shown an accumulator fuel injection system 100 for diesel engines which is engineered as an automotive common rail fuel injection system. FIG. 2 is a longitudinal sectional view which shows an internal structure of fuel injectors 2 installed in the fuel injection system 100 of FIG. 1.

The accumulator fuel injection system 100 includes a fuel tank 102, a high-pressure fuel supply pump 103, a common rail 104, and fuel injectors 2. The fuel supply pump 103 works to pump fuel out of the fuel tank 102 and pressurize and feed it to the common rail 104. The common rail 104 stores the fuel at a controlled high pressure and supplies it to the fuel injectors 2 through high-pressure fuel pipes 105, respectively. The fuel injectors 2, as illustrated in FIG. 1, are installed one in each of four cylinders of the diesel engine mounted in the automotive vehicle and work to inject the fuel, as accumulated in the common rail 104, directly into a combustion chamber of the diesel engine. The fuel injectors 2 are also connected to a low-pressure fuel path 106 to return the fuel back to the fuel tank 102.

Figure 3:
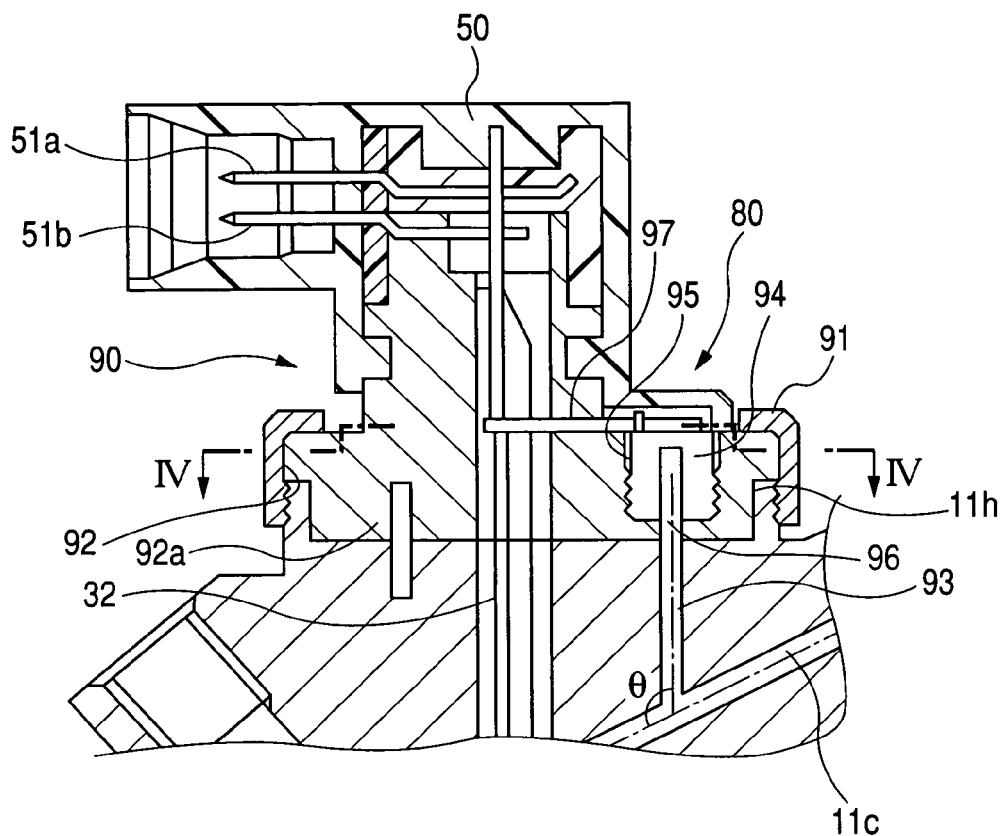
FIG. 3 is an enlarged partially sectional view of FIG. 2 which shows an internal structure of a head body in which a fuel pressure sensor is installed.

The accumulator fuel injection system 100 also includes an electronic control unit (ECU) 107 which is equipped with a typical microcomputer and memories and works to control an output of the diesel engine. Specifically, the ECU 107 samples and analyzes an output of a fuel pressure sensor 108 indicating the pressure of fuel in the common rail 104, an output of a crank angle sensor 109 indicating an angular position of a crankshaft of the diesel engine, an accelerator position sensor 110 indicating the position of an accelerator pedal (i.e., a driver's effort on the accelerator pedal) of the vehicle, and fuel pressure sensors 80, as illustrated in FIGS. 2 and 3, installed in the fuel injectors 2, respectively, to control the operation of the diesel engine.

The fuel injector 2, as can be seen in FIG. 2, includes the nozzle needle 20, the piezo-actuators 145 and 146, and the spring 35 working as a valve-closing mechanism. The nozzle needle 20 is disposed within the nozzle body 12 to be slidable to open or close the spray hole 12*b*. When charged, each of the piezo-actuators 145 and 146 expands to produce thrust force (i.e., drive force) which is, in turn, transmitted through a drive force transmission mechanism, as will be described later, to the nozzle needle 20. The spring 35 urges the nozzle needle 20 in the valve-closing direction in which the spray hole 12*b* is closed.

The fuel injector 2 consists essentially of a main body 126, an actuating mechanism 128, and the nozzle body 12 which are joined together by the retaining nut 14. The main body 126 has installed therein the control piston 30 and the cylinder 31. The control piston 30 and the cylinder 31 constitute the part of the valve-closing mechanism. The actuating mechanism 128 has installed therein first and second piezo-pistons 169 and 170 which constitute the part of the drive force transmission mechanism. The nozzle body 12 has the nozzle needle 20 installed therein and is secured to the top end of the main body 126.

The nozzle needle 20 is slidable in the axial direction of the fuel injector 2 to open or close the spray hole 12*b*. The nozzle needle 20 has a tapered head. The nozzle body 12 has formed therein the valve seat 12*a* on which the tapered head of the nozzle needle 20 is to be seated to close the spray hole 12*b*. The nozzle needle 20 has a rear portion borne by the nozzle body. The read end of the nozzle needle 20 is placed in contact abutment with a top end surface of the cylinder 30, so that the nozzle needle 20 is urged by and moved along with the cylinder 31 in the valve-closing direction.

The nozzle body 12 also has the fuel sump 12*c* in which the high-pressure fuel to be supplied to the spray hole 12*b* is accumulated, a guide hole communicating between the fuel sump 12*c* and the spray hole 12*b*, and the fuel feeding path 12*d* through which the high-pressure fuel flows to the fuel sump 12*c*.

Each of the piezo-actuators 145 and 146 is made of a stack of piezoelectric plates 117. Each of the piezoelectric plates 117 has an inner electrode formed by evaporating and depositing conductive material on one of opposed major surfaces thereof. Two outer electrodes 143 are affixed, one to each of opposed side surfaces of the stack of the piezoelectric plates 117. Each of the outer electrodes 143 makes an electrical connection between alternate ones of the piezoelectric plates 117.

When voltage is applied to the stack of the piezoelectric plates 117 of each of the first and second piezo-actuators 145 and 146, it expands in a lengthwise direction thereof to develop a stroke. The amount of stroke of the stack of the piezoelectric plates 117 depends upon the degree of voltage applied thereto. The amount of stroke, as referred to herein, is an amount by which each of the first and second piezo-actuators 145 and 146 expands as a whole.

Each of the first and second piezo-actuators 145 and 146 is disposed within a hollow cylinder 148 in contact therewith and retained within the actuator body 151 while being pressed by a press member 149. An elastic film 152 is fit in an end of each of the hollow cylinder 148 to create a hermetic seal. Each of the press members 149 presses a corresponding one of the first and second piezo-actuators 145 and 146 through the elastic film 152 and an adjustment shim 153 to transmit the drive force, as produced by the one of the first and second piezo-actuators 145 and 146 to a corresponding one of the first and second piezo-pistons 169 and 170.

The drive force transmission mechanism includes the first and second piezo-pistons 169 and 170 which are moved by the drive force transmitted from the first and second piezo-actuators 145 and 146. The drive force transmission mechanism works to amplify and transmit the movement (i.e., the amount of stroke) of the first and second piezo-pistons 169 and 170 hydraulically as the drive force to the control piston 30 and the cylinder 31 through the fuel. The amplification of the movement of the first and second piezo-pistons 169 and 170 is based on Pascal's law. Specifically, the driver force transmission mechanism includes first and second piezo-pressure chambers 171 and 172 and first and second fuel flow paths 173 and 174. The fuel in each of the first and second piezo-pressure chambers 171 and 172 are elevated in pressure by the movement of a corresponding one of the first and second piezo-pistons 169 and 170. The elevated pressure of the fuel is transmitted to a booster chamber 158 through the first and second fuel flow paths 173 and 174. The booster chamber 158 is defined by the end of the nozzle body 12 within the main body 126, so that the pressure of the fuel in the booster chamber 158 is exerted on the end of the cylinder 31. Specifically, the movement of the first and second piezo-pistons 169 and 170 is amplified and transmitted hydraulically to the cylinder 31 through the first and second piezo-pressure chambers 171 and 172, the first and second fuel flow paths 173 and 174, and the booster chamber 158. The amplification of the movement of the first and second piezo-pistons 169 and 170 depends upon a ratio of a pressure-transmitting area to a pressure-exerted area (i.e., the pressure-transmitting area/the pressure-exerted area) where the pressure-transmitting area is an area of the ends of the first and second piezo-pistons 169 and 170 which pressurize the fuel within the first and second piezo-pressure chambers 171 and 172, and the pressure-exerted area is an area of a portion of the end of the cylinder 31 on which the pressure of the fuel in the booster chamber 158 is exerted directly, that is, an area of the whole of the top end (i.e., the lower end, as viewed in FIG. 30) of the cylinder 31 minus an area of the whole of the rear end (i.e., the upper end, as viewed in FIG. 30) of the nozzle needle 20.

The top end of the cylinder 31 is exposed directly to the booster chamber 158, so that the pressure of fuel in the booster chamber 158 urges the cylinder 31 in the valve-opening direction in which the nozzle needle 20 is lifted up to open the spray hole 12*b*. The amount of lift of the nozzle needle 20 depends upon the amount of strokes of the first and second piezo-actuators 145 and 146.

Disc springs 159 are disposed in the first and second piezo-pressure chambers 171 and 172 to urge the first and second piezo-pistons 169 and 170 into abutment with the first and second piezo-actuators 145 and 146, respectively. Each of the disc springs 159 functions as a return spring to apply a given initial pressure to the stack of the piezoelectric plates 117 to avoid the breakage arising from over-expansion thereof. Instead of the disc springs 159, coil springs may be employed.

The valve-closing mechanism includes the spring 35, the control piston 30, and the cylinder 31. The spring 35 is disposed on the rear end of the cylinder 31 to urge it in the valve-closing direction. The control piston 30 is urged hydraulically by the pressure of fuel in the control piston-pressure chamber 163 into abutment with the cylinder 31 and pushes the cylinder 31 in the valve-closing direction. The cylinder 31 is placed in contact abutment with the rear end of the nozzle needle 20 and transmits the sum of pressures, as produced by the fuel in the control piston-pressure chamber 163 and the spring 35, to the nozzle needle 20. Specifically, the valve-closing mechanism works to exert the pressures, as produced by the fuel in the control piston-pressure chamber 163 and the spring 35, on the nozzle needle 20 and urge it in the valve-closing direction. The valve-closing mechanism also works to exert the pressure of fuel in the booster chamber 158 on the cylinder 31 in the valve-opening direction to permit the nozzle needle 20 to be lifted up to open the spray hole 12b.

The control piston-pressure chamber 163 communicates with the fuel supply path 11b and is exposed to the high-pressure fuel at all the time. To the spring chamber 11d2 in which the spring 35 is disposed, the fuel leaks from the control piston-pressure chamber 163 and the booster chamber 158 and is, in turn, drained to the fuel tank 102 through a fuel drain path (not shown).

The operation of the fuel injector 2 will be described below. When it is required to open the spray hole 12b, the first and second piezo-actuators 145 and 146 are energized by control signals from the ECU 107, so that the stacks of the piezoelectric plates 117 are charged to produce the drive forces, thereby moving the first and second piezo-pistons 169 and 170, respectively. This causes the pressure of fuel in the booster chamber 158 to be elevated in level, thereby transmitting the drive forces hydraulically to the cylinder 31 in the valve-opening direction. The pressure of fuel in the booster chamber 158 lifts up the cylinder 31 against the pressure, as produced by the spring 25, so that the nozzle needle 20 is moved upward to open the spray hole 12b to spray the fuel into the engine. The amount of lift of the nozzle needle 20, as described above, depends upon the amount of strokes of the first and second piezo-actuators 145 and 146. The injection rate of the fuel, thus, depends upon the amount of strokes.

When it is required to close the spray hole 12b, the ECU 107 stops outputting the control signals to the first and second piezo-actuators 145 and 146. The stacks of the piezoelectric plates 117 are discharged, so that the drive forces, as produced by the first and second piezo-actuators 145 and 146, disappear. The pressure of fuel in the first and second piezo-pressure chambers 171 and 172 and the booster chamber 158 then drops to decrease the pressure urging the cylinder 31 in the valve-opening direction against the pressure, as produced by the spring 35. When the pressure acting on the cylinder 31 in the valve-closing direction has exceeded that in the valve-opening direction, it will cause the nozzle needle 20 to be moved downward to close the spray hole 12b to terminate the spraying of the fuel into the engine.

The fuel injector 2, as already described, has the first piezo-piston 169 which is moved by the drive force produced by the first piezo-actuator 145 and the second piezo-piston 170 which is moved by the drive force developed by the second piezo-actuator 146. The first and second piezo-actuators 145 and 146 are, as described above, disposed in alignment within the hollow cylinders 148 in contact abutment with the press members 149, respectively. The first and second piezo-pistons 169 and 170 are pressed by the press members 149 through the elastic films 152 and the adjustment shims 153 and also to be moved by the drive forces produced by the first and second piezo-actuators 145 and 146, respectively.

The first and second piezo-pistons 169 and 170 transmit the drive forces produced by the first and second piezo-actuators 145 and 156 hydraulically to the nozzle needle 20. Specifically, the drive force transmission mechanism works to transmit the drive forces to the cylinder 31 through the first and second piezo-pistons 169 and 170 and also to amplify and transmit the movements of the first and second piezo-pistons 169 and 170 to the cylinder 31. The first and second piezo-pistons 169 and 170 define the first and second piezo-pressure chambers 171 and 172 within the main body 126 and work to elevate the pressures of fuel in the first and second piezo-pressure chambers 171 and 172. The elevated pressures are, in turn, transmitted to the booster chamber 158 through the first and second fuel flow paths 173 and 174 and exerted on the cylinder 31. The drive force transmission mechanism may, therefore, work to transmit the drive forces, as produced by the first and second piezo-actuators 145 and 146, and the amount of strokes of the first and second piezo-actuators 145 and 146 to the cylinder 31 independently.

The ratio of the pressure-transmitting area that is the sum of areas of the ends of the first and second piezo-pistons 169 and 170 which contribute to pressurize the fuel in the first and second piezo-pressure chambers 171 and 172 to the pressure-exerted area that is the area of a portion of the end of the cylinder 31 on which the pressure of the fuel in the booster chamber 158 is exerted directly may be changed by selecting one of the first and second piezo-pistons 169 and 170 which is to be energized to pressurize the fuel in a corresponding one of the first and second piezo-pressure chambers 171 and 172. Specifically, the degree of the drive force, as developed by the first and second piezo-actuators 145 and 146, and the amount of strokes of the first and second piezo-actuators 145 and 146 to be converted into the amount of lift of the cylinder 31 depend upon the above area ratio based on Pascal's law. The drive forces are amplified greatly as the area ratio is decreased, while the amount of strokes is amplified greatly as the area ratio is increased. Therefore, when a greater drive force is required to lift up the nozzle needle 20, for example, to initiate the injection of fuel into the engine, the ECU 107 may select one of the first and second piezo-actuators 145 and 146 which serves to move one of the first and second piezo-pistons 169 and 170 so as to decrease the area ratio more greatly in order to ensure the stability in opening the spray hole 12b. Alternatively, when a greater amount of lift of the nozzle needle 20 is required to assure a required quantity of fuel to be injected into the engine, for example, after the initiation of the injection of fuel, the ECU 107 may select one of the first and second piezo-actuators 145 and 146 which serves to move one of the first and second piezo-pistons 169 and 170 so as to increase the area ratio more greatly.

The fuel injector 2 may alternatively be designed to have only one of combinations of the first piezo-actuator 145 and the first piezo-piston 169 and the second piezo-actuator 146 and the second piezo-piston 170.

The fuel injector 2 also includes a head body 90 which is equipped with the fuel pressure sensor 80 and joined to the upper end of the injector body (i.e., the actuator body 151).

The injector body has a first coupling 11f to which the high-pressure fuel pipe 105, as illustrated in FIG. 1, connecting with the common rail 104 is joined hermetically and a second coupling 11t to which the low-pressure fuel pipe 106 is joined hermetically to drain the fuel from the fuel injector 2 to the fuel tank 102. The coupling 11f serves as an inlet of the fuel injector 2 to which the fuel is delivered from the common rail 104. The coupling 11f has a fuel inlet port 21 at which the high-pressure fuel, as supplied from the common rail 104, enters and a fuel inlet path 11c through which the fuel is delivered to the fuel supply path 11b. The fuel inlet path 11c has a bar filter 13 installed therein.

The fuel inlet path 11c is inclined at a given angle to the longitudinal center line (i.e., an axial direction) of the injector body (i.e., the fuel supply path 11b). In terms of ease of joining of the high-pressure fuel pipe 105 to the first coupling 11f, the fuel inlet path 11c is preferably so formed as to extend at an angle of 45° to 60° to the axial direction of the injector body. The first coupling 1 if also has a branch path 93 extending or diverging from the fuel inlet path 11c substantially parallel to the axial direction of the injector body. Specifically, the branch path 93, as illustrated in FIG. 3, slants at an angle θ of 120° to 135° to a flow of the fuel within the fuel inlet path 11c (i.e., a longitudinal center line of the fuel inlet path 11c), as viewed from the downstream side of the fuel inlet path 11c.s The branch path 93 extends preferably parallel to the axial direction of the injector body (i.e., the actuator body 151), but may be inclined thereto as long as the angle which the branch path 93 makes with the fuel inlet path 11c is greater than or equal to 90°.

The amount of fuel compensating for that having been sprayed and/or drained from the fuel injector 2 is delivered to the fuel inlet path 11c from the common rail 104 during or immediately after the operation of the fuel injector 2. The pressure in the fuel inlet path 11e is high, so that in the case where the branch path 93 is oriented at an angle smaller than 90° toward the direction of flow of the fuel in the fuel inlet path 11c (i.e., the forward direction), it will cause the high-pressure to be always exerted into the branch path 93 during the delivery of the fuel into the fuel inlet path 11c, thus resulting in a small difference in pressure of the fuel between when the fuel injector 2 is spraying the fuel and when the fuel injector 2 does not spray the fuel. In the case, as illustrated in FIGS. 2 and 3, where the branch path 93 is inclined against the direction of flow of the fuel in the fuel inlet path 11c, the movement of the high-pressure fuel within the fuel inlet path 11e creates hydraulic attraction to attract the fuel within the branch path 93 toward the joint between the branch path 93 and the fuel inlet path 11c during the delivery of the fuel from the common rail 104. Specifically, when the pressure of fuel in the fuel inlet path 11c has dropped, it will cause the hydraulic attraction to increase in a direction in which the pressure of fuel in the branch path 93 is further decreased, thus resulting in a great difference in pressure of the fuel between when the fuel injector 2 is spraying the fuel and when the fuel injector 2 does not spray the fuel.

The second coupling 11t of the injector body has a drain path 37 through which the fuel in the spring chamber 11d2 is drained to the fuel tank 102 through the low-pressure fuel pipe 106.

The piezo-actuators 145 and 146 connect with a power supply (not shown) through conductive leads 32 and, terminal pins 51a and 51b of an electric connector 50. The leads 32 are retained by a holder which is higher in rigidity than the leads 32.

The holder is made of resin such as nylon which is lower in hardness than metal in order to minimize the wear of coating of the leads 32. The holder is designed to have the shape and thickness selected to have a rigidity greater than that of the leads 32.

Ends of the leads 32 protrude from one of opposed ends of the injector body which is farther from the spray hole 12b, that is, which is above the first coupling 11f, as viewed in FIG. 2. The connector 50 is molded integrally with the terminal pins 51a and 51b. The connector 50 is fitted in the head body 90 so as to make electrical joints between the terminal pins 51a and 51b and the leads 32.

The structure of the head body 90 will be described below in detail with reference to FIG. 3.

The head body 90 is joined to the upper end of the injector body (i.e., the actuator body 151). The injector body has formed in the upper end a circular recess 11h which has a bottom into which the branch path 93 extending from the fuel inlet path 11c opens. The injector body has an external thread formed on the upper end thereof.

The head body 90 has a lower surface 92 (which will also be referred to as a fitting surface below) contoured to conform with the contour of the upper end of the injector body. The fitting surface 92 defines a circular protrusion 92a which is fitted in the recess 11h of the injector body. In other words, the actuator body 151 has an annular extension extending around the edge of the upper end thereof to define the recess 11h. The head body 90 has a lower portion whose circumferential wall is so recessed as to be fitted to the annular extension of the actuator body 151 and to define the protrusion 92a. Specifically, the protrusion 92a serves as a guide to guide the alignment of the head body 90 with the injector body when the head body 90 is joined to the injector body.

The head body 90 has an in-head path 96 extending in alignment with the branch path 93 and a cylindrical sensor mount chamber 95 (which will also be referred to a stem mount chamber). The fuel pressure sensor 80 includes a metal stem 94. The metal stem 94 is fit in the sensor mount chamber 95. The in-head path 96 communicates with the sensor mount chamber 95.

The joining of the head body 90 with the injector body is achieved by fastening a retaining nut 91 to establish engagement of an internal thread of the retaining nut 91 with the external thread of the actuator body 151. The use of the retaining nut facilitates the ease of removal of the head body 90 from the actuator body 151. A portion of the head body 90 which has the fitting surface 92 and an outer surface covered by the retaining nut 91 in contact therewith will also be referred to as a flange-like base.

Figure 5A:
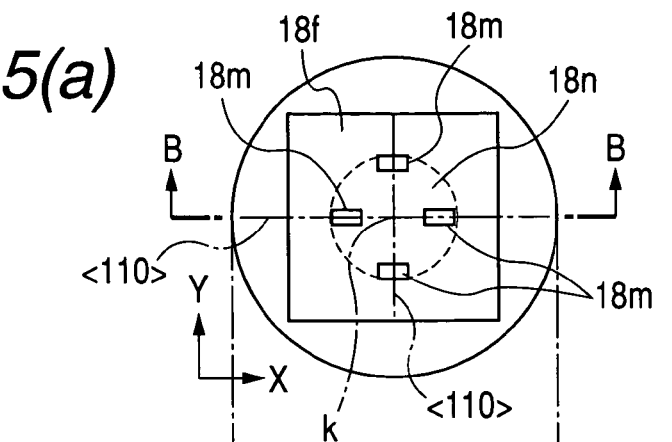
FIG. 5(a) is a plane view which shows a fuel pressure sensor mounted in the head body of FIG. 3.

The base of the head body 90 has formed therein a hole defining the sensor mount chamber 95. The sensor mount chamber 95 extends vertically from the upper surface opposite the fitting surface 92. The metal stem 94 is screwed into the sensor mount chamber 95 from the upper surface of the base. Specifically, the sensor mount chamber 95 has an external thread formed on an inner wall thereof. The metal stem 94 has an external thread formed on an outer wall thereof. The installation of the metal stem 94 in the head body 90 is achieved by engaging the external thread of the metal stem 94 with the internal thread of the sensor mount chamber 95. This creates a hermetic seal between the sensor mount chamber 95 and the metal stem 94 and facilitates the removal of the metal stem 94 from the head body 90. The metal stem 94 is, as will be described later in detail with reference to FIGS. 5(a) and

5(*b*), equipped with a diaphragm 18*n* on which a pressure sensor chip 18*f* and a ceramic circuit board 98 are installed.

Figure 4:
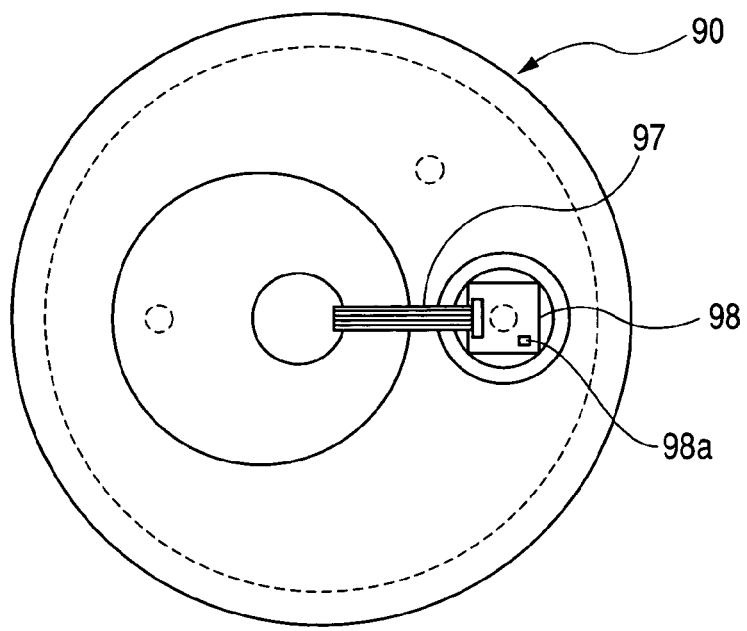
FIG. 4 is a transverse sectional view, as taken along the line IV-IV in FIG. 3.

The ceramic circuit board 98, as illustrated in FIG. 4, has a plurality of conductive terminals 97 making electric connections between conductors printed on the circuit board 98 and the leads 32 for transmitting an output of the pressure sensor chip 18*f* to the ECU 107. The terminals 97 extend above or on the surface of the base and connect with the leads 32.

A combination of the depth of the sensor mount chamber 95 and the length of the metal stem 94 is selected to have the upper end of the metal stem 94 lying near the upper surface of the base of the head body 90. For instance, the upper end of the metal stem 94 lies flush with the upper surface of the base of the head body 90 in order to facilitate the laying out of conductive wires connecting with a sensor signal processor of the pressure sensor chip 18*f* installed on the metal stem 94.

Figure 5B:
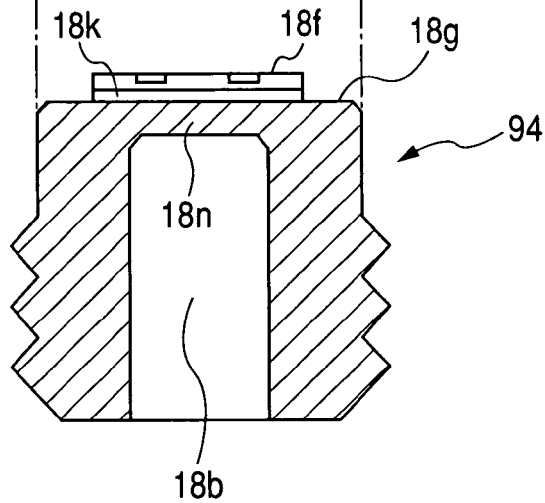
FIG. 5(b) is a longitudinal sectional view, as taken along the line B-B in FIG. 5(a), which shows a stem that is the part of a fuel pressure sensor mounted in the head body of FIG. 3.

The metal stem 94 is, as illustrated in FIGS. 5(*a*) and 5(*b*), made of a hollow cylindrical metal and shaped to have a thin-walled flat bottom (i.e., the upper end wall, as viewed in the drawing) to define the diaphragm 18*n*. The metal stem 94 also has a pressure-sensing chamber 18*b* which, as illustrated in FIG. 3, leads to the branch path 93 through the in-head path 96 to have the diaphragm 18*n* exposed to the pressure of fuel supplied to the fuel injector 2.

The metal stem 94, as described above, has the external thread formed on the circumference thereof. The sensor mount chamber 95 of the head body 90 also has the external thread formed on the inner circumference thereof. The installation of the metal stem 94 in the sensor mount chamber 95 is achieved by fastening the metal stem 94 into the sensor mount chamber 95 to establish tight engagement between the external and internal threads.

The ceramic circuit board 98 is, as illustrated in FIGS. 4, 5(*a*), and 5(*b*) glued or bonded to the flat surface of the head body 90 around the pressure sensor chip 18*f*. The ceramic circuit board 98 has bonded thereon an amplifier IC chip 98*a* working to amplify an output of the pressure sensor chip 18*f* and a characteristic adjustment IC chip. The characteristic adjustment IC chip includes a non-volatile memory which stores data on the sensitivity of the pressure sensor chip 18*f* and the injection quantity characteristic of the fuel injector 2.

The sensor mount chamber 95 in which the metal stem 74 is disposed communicates with the in-head path 96. The high-pressure fuel introduced into the fuel inlet path 73 through the fuel inlet path 11*c* is, therefore, directed partially into the pressure sensing chamber 18*b* so that the pressure of the high-pressure fuel is exerted on the diaphragm 18*n*.

The pressure sensor chip 18*f* is made of monocrystal silicon (Si) and is, as illustrated in FIGS. 5(*a*) and 5(*b*), affixed to the outer surface of the diaphragm 18*n* of the metal stem 94 through a low-melting glass material. The pressure sensor chip 18*f* works as a stain gauge which is responsive to the degree of elastic deformation or strain of the diaphragm 18*n*, as developed by the pressure of fuel introduced into the pressure sensing chamber 18*b* of the metal stem 74. The structure of the fuel pressure sensors 80 will also be described below in detail with reference to FIGS. 5(*a*) and 5(*b*) and FIGS. 6(*a*) to 6(*c*). The metal stem 94 has the following measurements. The outer diameter is 6.5 mm. The inner diameter (i.e., the diameter of the pressure sensing chamber 18*b*) is 2.5 mm. The thickness of the diaphragm 18*n* required under 20 MPa is 0.65 mm, and under 200 MPa is 1.40 mm. The pressure sensor chip 18*f* affixed to the surface 18*g* of the diaphragm 18*n* is made of a monocrystal silicon substrate 18*r* which has a plane direction of (100) and an uniform thickness. The pressure sensor chip 18*f* is secured at the bottom thereof to the surface 18*g* of the diaphragm 18*n* through a glass layer 18*k* made from a low-melting glass material. The silicon substrate 18*r* is 3.56 mm×3.56 mm in square and 0.2 mm in thickness. The glass layer 18*k* is 0.06 mm in thickness.

The pressure sensor chip 18*f* is equipped with four rectangular gauges 18*m*. The gauges 18*m* are each implemented by a piezoresistor. The silicon substrate 18*r* whose plane direction is (100) structurally has orthogonal crystal axes <110>.

The gauges 18*m* are disposed two along each of the orthogonal crystal axes <110>. Two of the gauges 18*m* are so oriented as to have long side thereof extending in the X-direction, while the other two gauges 18*m* are so oriented as to have short sides extending in the Y-direction. The four gauges 18*m* are, as can be seen from FIG. 5(*a*), arrayed along a circle whose center lies at the center κ of the diaphragm 18*n*.

Figure 6A:
FIGS. 6(a), 6(b), and 6(c) are sectional views which show a sequence of process of producing a pressure sensor chip affixed to the stem of FIG. 5(b)
Figure 6B:
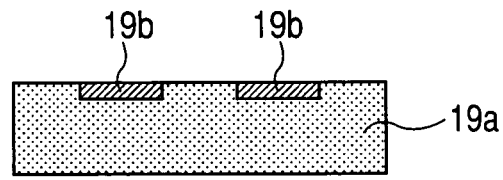
Figure 6C:
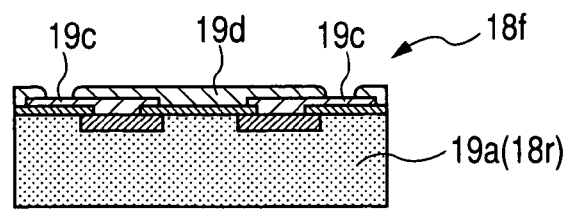

The pressure sensor chip 18*f* also has wires and pads (not show) which connect the gauges 18*m* together to make a typical bridge circuit and make terminals to be connected to an external device (i.e., the ECU 107). The bridge circuit is covered with a protective film. The pressure sensor chip 18*f* is substantially manufactured in the following steps, as demonstrated in FIGS. 6(*a*) to 6(*c*). First, an n-type sub-wafer 19*a* is prepared. A given pattern is drawn on the sub-wafer 19*a* through the photolithography. Subsequently, boron is diffused over the sub-wafer 19*a* to form p+ regions 19*b* that are piezoresistors working as the gauges 18*m*. Wires and pads 19*c* are formed on the sub-wafer 19*a*, as illustrated in FIG. 6(*c*). An oxide film 19*d* is also formed over the surface of the sub-wafer 19*a* to secure electric insulation of the wires and the pads 19*c*. Finally, a protective film is also formed over the surface of the sub-wafer 19*a* and then etched to expose the pads to outside the sub-wafer 19*a*. The pressure sensor chip 18*f* thus produced is glued to the diaphragm 18*n* of the metal stem 94 using the low-melting glass 18*k* to complete the pressure sensor chip 18*f*.

The diaphragm 18*n* is flexed when subjected to the pressure of fuel entering the pressure sensing chamber 18*b* of the metal stem 94. The pressure sensor chip 18*f* is responsive to the flexing of the diaphragm 18*n* to convert it into an electric signal (i.e., a difference in potential of the bridge circuit arising from a change in resistance of the piezoresistors or gauges 18*m*). The sensor signal processor mounted on the ceramic circuit board 98 processes the signal, as produced by the pressure sensor chip 18*f*, and output it to the ECU 107. The sensor signal processor may be fabricated monolithically on the pressure sensor chip 18*f*.

As described above, the head body 90 equipped with the fuel pressure sensor 80 is located on the upper end of the injector body which is far from the spray hole 12*b*. This structure enables the operation of the pressure sensor chip 18*f* or the sensor signal processor to be diagnosed before the head body 90 is fixed to the injector body. If a failure in operation of the pressure sensor chip 18*f* is found, it may be replaced easily. For example, the metal stem 94 or the ceramic circuit board 98 may be replaced before installed in the fuel injector 2. It is, therefore, possible to install only the head bodies 90 in which the fuel pressure sensors 80 have been checked to operate properly to the injector bodies of the fuel injectors 2, thereby improving the fabrication yield of the fuel injectors 2. The head body 90 is secured to a portion of the injector body which is farther from the spray hole 12*b* than the piezo-pressure chambers 171 and 172, thus facilitating the laying out of signal wires joined to the fuel pressure sensor 80 in the head body 90 and improving the productivity of the fuel injectors 2 further.

Figure 7:
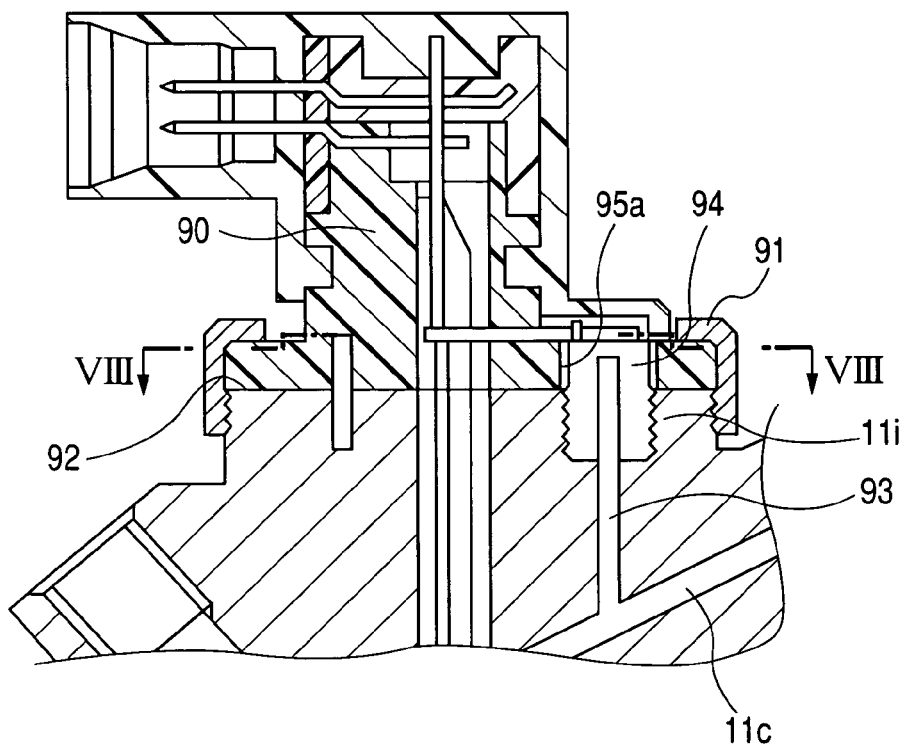
FIG. 7 is an enlarged partially sectional view which shows an internal structure of a head body and an injector body of a fuel injector according to the second embodiment of the invention.
Figure 8:
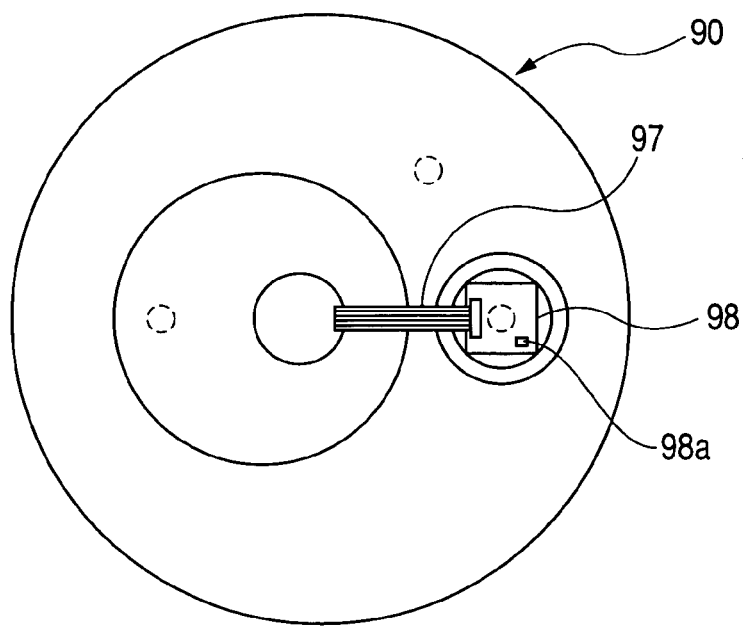
FIG. 8 is a transverse sectional view, as taken along a line V VIII-VIII in FIG. 7.

The fuel injectors 2 of the second embodiment will be described below with reference to FIGS. 7 and 8 which may be employed in the accumulator fuel injection system 100 of FIG. 1. The same reference numbers, as employed in the above embodiment, will refer to the same parts, and explanation thereof in detail will be omitted here.

The structure of the fuel injector 2 is different from that in the first embodiment in that the metal stem 94 is installed through the base of the head body 90 threadably in the upper end of the injector body.

Specifically, the injector body has a cylindrical hole 11*i* formed in the upper end thereof. The cylindrical hole 11*i* has a depth shorter than the length of the metal stem 94 and defines a portion of a sensor mount chamber in which the metal stem 94 is disposed. The hole 11*i* has an internal thread formed on an inner circumference thereof. The branch path 93 extends from the bottom of the hole 11*i* to the fuel inlet path 11*c*.

The head body 90 has a cylindrical hole 95*a* formed through the thickness of the base thereof. The hole 95*a* defines the sensor mount chamber together with the cylindrical hole 11*i* of the injector body. The installation of the metal stem 94 in the injector body is achieved by inserting the metal stem 94 into the hole 95*a* and screwing it into the cylindrical hole 11*i* of the injector body.

When the metal stem 94 is screwed fully into the hole 11*i* of the injector body, the upper end of the metal stem 94 is placed near the upper surface of the base of the head body 90, thereby facilitating the laying out of conductive wires connecting with the sensor signal processor of the pressure sensor chip 18*f* installed on the metal stem 94.

The metal stem 94 is, as described above, installed at the top end thereof in the injector body by the tight engagement of the external thread of the metal stem 94 with the internal thread of the injector body which ensures an air-tight seal therebetween, thus permitting the degree of air-tightness to be lowered in the head body 90.

Figure 9:
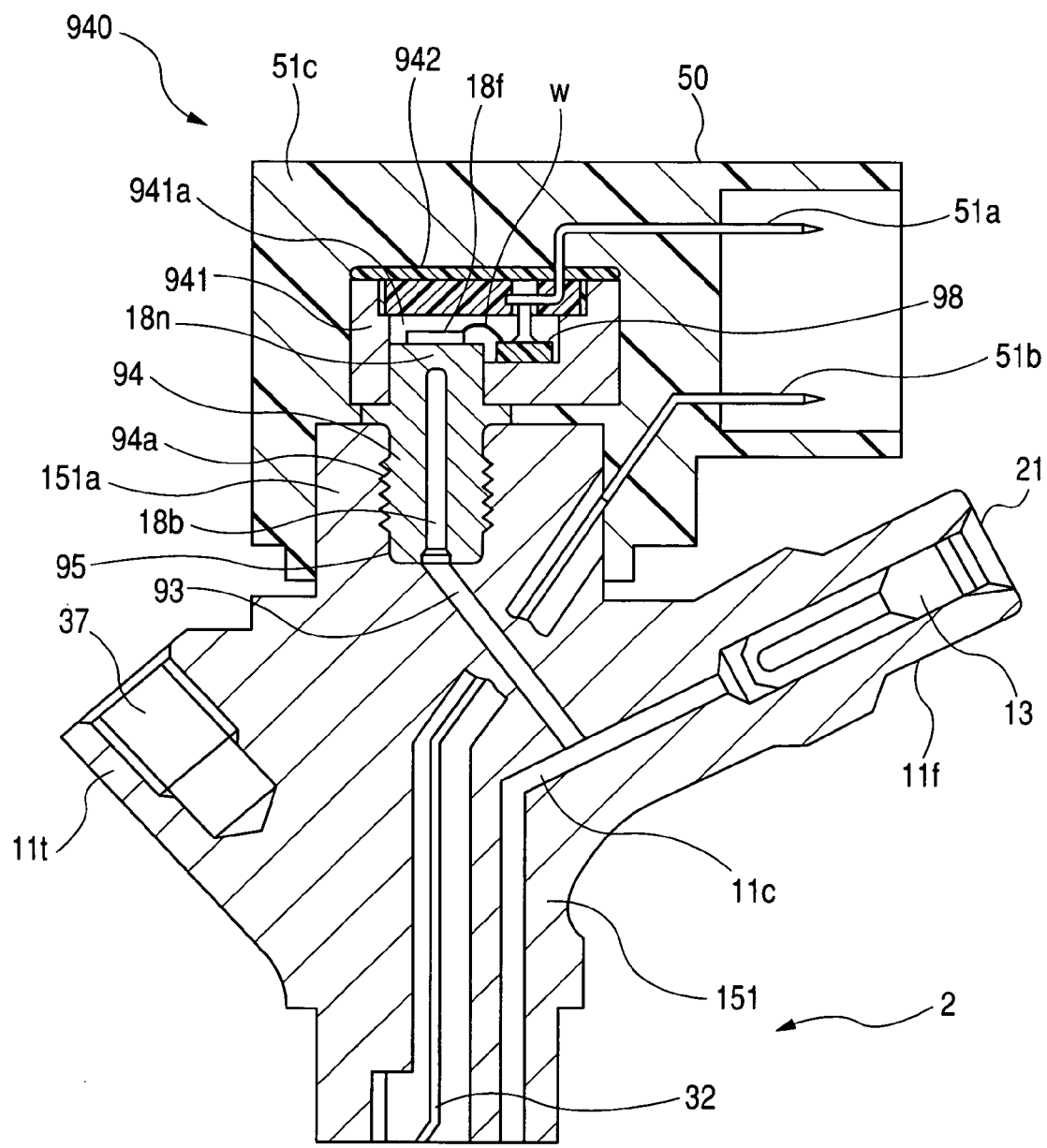
FIG. 9 is an enlarged partially sectional view which shows an internal structure of a head body and an injector body of a fuel injector according to the third embodiment of the invention.

The fuel injectors 2 of the third embodiment will be described below with reference to FIG. 9 which may be employed in the accumulator fuel injection system 100 of FIG. 1. The same reference numbers, as employed in the above embodiments, will refer to the same parts, and explanation thereof in detail will be omitted here.

The fuel injector 2 of the first embodiment is designed to have the head body 90 attached detachably to the upper end of the injector body (i.e., the actuator body 151) and the fuel pressure sensor 80 installed in the head body 90. Specifically, an assembly of the head body 90, the metal stem 94, and the pressure sensor chip 18*f* is prepared and then secured to the actuator body 151. In contrast, the fuel injector 2 of the third embodiment is designed not to have the head body 90, but to have a fuel pressure-sensing unit 940 made up of the metal stem 94 and the pressure sensor chip 18*f*.

The actuator body 151 has a cylindrical boss 151*a* formed on the upper end thereof, as viewed in the drawing. The boss 151*a* has formed therein a sensor mount chamber 95 in which the metal stem 94 is disposed. The metal stem 94, like in the above embodiments, has an external thread formed on an outer circumference thereof. The sensor mount chamber 95 has an internal thread formed on an inner circumference thereof. The installation of the metal stem 94 in the boss 151*a* of the actuator body 151 is achieved by screwing the metal stem 94 into the sensor mount chamber 95 to establish tight engagement of the external thread of the metal stem 94 with the internal thread of the boss 151*a*.

When the metal stem 94 is screwed fully into the boss 151*a*, the pressure-sensing chamber 18*b* communicates with the branch path 93 extending from the fuel inlet path 11*c*, so that the pressure of fuel supplied into the fuel injector 2 is exerted on the diaphragm 18*n* of the metal stem 94. The branch path 93, as clearly illustrated in the drawing, extends obliquely upward from the middle of the fuel inlet path 11*c* to the longitudinal center line (i.e., the axis) of the fuel injector 2 and connects with the bottom of the sensor mount chamber 95. The pressure sensor chip 18*f* is, like in the first embodiment, affixed to the upper surface of the diaphragm 18*n*.

The metal stem 94 has a metal base block 941 fit thereon. The base block 941 is of a trough-shape and has a bottom and a side wall which define an inner chamber 941*a*. The base block 941 has formed in the bottom a through hole in which the metal stem 94 is fitted. The upper surface of the diaphragm 18*n* on which the pressure sensor chip 18*f* is disposed protrudes inwardly from the bottom and is exposed to the inner chamber 941*a*. The ceramic circuit board 98 is mounted on the inner surface of the bottom of the base block 941. The ceramic circuit board 98 are connected electrically to the pressure sensor chip 18*f* through wires W, as made by the wire bonding machine and, like in the first embodiment has fabricated thereon the amplifier IC chip 98*a* working to amplify the output of the pressure sensor chip 18*f* and the characteristic adjustment IC chip. The ceramic circuit board 98 and the pressure sensor chip 18*f* are disposed inside the inner chamber 941*a* of the base block 941. An upper open end of the inner chamber 941*a* is closed by a resinous cover 942.

The metal stem 94 and the base block 941 are covered by a resinous housing 51*c* together with the boss 151*a* of the actuator body 151. The housing 51*c* also serves as a connector housing in which the terminals 51*a* and 51*b* of the connector 50 are disposed. The terminal 51*a* is coupled with the ceramic circuit board 98. The terminal 51*b* is coupled with the leads 32 to supply the electric power to the piezo-actuators 145 and 146. The housing 51*c* may be designed to be assembled together with the metal stem 94 and the base block 941 as the fuel pressure-sensing unit 940 unit which is to be secured detachably to the actuator body 151 or to be fitted on the actuator body 151 separately from the fuel pressure-sensing unit 940 (i.e., the assembly of the metal stem 94 and the base block 941).

The joining of the fuel pressure-sensing unit 940 to the actuator body 151 is accomplished by the threadable engagement of the metal stem 94 with the actuator body 151. The base block 941 is fixed on the metal stem 94. The ceramic circuit board 98 is fixed on the bottom of the base block 941. The removal of the fuel pressure-sensing unit 940 from the actuator body 151 is, therefore, achieved by removing the metal stem 94 from the actuator body 151. Specifically, the detachable installation of the fuel pressure-sensing unit 940 on the actuator body 151 is achieved by the threadable engagement of the metal stem 94 with the actuator body 151.

The fuel pressure-sensing unit 940 is, as described above, designed to be installed detachably to the actuator body 151, thus enabling the operation of the pressure sensor chip 18*f* or the sensor signal processor to be diagnosed before the fuel pressure-sensing unit 940 is joined to the actuator body 151. If a failure in operation of the pressure sensor chip 18*f* is found, it may be replaced easily. For example, the metal stem 94 or the ceramic circuit board 98 may be replaced before installed in the fuel injector 2. It is, therefore, possible to install only the fuel pressure-sensing unit 940 in which the fuel pressure sensor 80 has been checked to operate properly to the injector body of the fuel injector 2, thereby improving the fabrication yield of the fuel injector 2.

The fuel pressure-sensing unit 940 is secured to a portion of the injector body (i.e., the actuator body 151) which is farther from the spray hole 12*b* than the piezo-pressure chambers 171 and 172, thus facilitating the laying out of signal wires joined to the fuel pressure sensor 80 in the fuel pressure-sensing unit 940 and improving the productivity of the fuel injectors 2 further.

The branch path 93 diverging from the fuel inlet path 11c is formed to extend obliquely upward to the axis of the actuator body 151, so that the branch path 93 opens into a portion of the bottom of the sensor mount chamber 95 which lies on the axis of the actuator body 151. In other words, an opening of the branch path 93 is so formed in the bottom of the sensor mount chamber 95 as to coincide with the longitudinal center line of the actuator body 151 (i.e. the fuel injector 2). The fuel pressure-sensing unit 940 is, thus, located substantially in alignment with the longitudinal center line of the actuator body 151, in other words, radial protrusion of the fuel pressure-sensing unit 940 from the actuator body 151 is minimized, thereby minimizing the space in the engine compartment to be occupied by the whole of the fuel injector 2.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A fuel injector comprising:
an injector body having a length with a first end portion and a second end portion at opposite ends thereof, said injector body also having a fuel inlet to which fuel is supplied externally from a common rail, a fuel flow path through which the fuel supplied to the fuel inlet flows, and a spray hole which is formed in the second end portion in communication with the fuel flow path and from which the fuel is sprayed;
a head body formed to be separate from said injector body, said head body being joined to a joint surface of the first end portion of said injector body;
a fuel pressure sensor installed in said head body, said fuel pressure sensor including a diaphragm which is formed to be separate from the injector body and which communicates with the fuel flow path in said injector body and a sensing device, the diaphragm being exposed to the fuel so as to be deformed as a function of a pressure of the fuel, the sensing device producing a signal as a function of a degree of deformation of the diaphragm; and
a nozzle needle which is movable in an axial direction of said injector body to open and close the spray hole selectively, an electric actuator working to control movement of said nozzle needle in the axial direction of said injector body.

2. A fuel injector as set forth in claim 1, further comprising a pressure control chamber into or from which the fuel is fed or discharged by an operation of said electric actuator and which exerts pressure of the fuel, as fed thereinto, on a control piston to urge said nozzle needle in a valve-closing direction in which the spray hole is closed, wherein said nozzle needle, said electric actuator, said control piston, and said pressure chamber are disposed in said injector body, and wherein the first end portion of said injector body to which said head body is joined is located farther from the spray hole than said pressure control chamber.

3. A fuel injector as set forth in claim 1, wherein the first end portion of said injector body has a first end surface, a recess formed in the first end surface to have a given depth, and a branch path which diverges from the fuel flow path and opens on a portion of the recess, and wherein said head body includes a base which has a fitting surface which is fitted to the first end surface and a protrusion which includes a portion of the fitting surface and is contoured to conform with contour of the recess, the recess defining said joint surface.

4. A fuel injector as set forth in claim 3, wherein the base of said head body has an upper surface opposed to the fitting surface, a stem mount chamber extending from the upper surface toward the fitting surface to have a bottom from which an in-head path extends to the branch path, and a hollow cylindrical stem installed in the stem mount chamber, and wherein the stem has first and second ends opposed to each other, the first end being closed to define the diaphragm of said fuel pressure sensor, the second end opening into the in-head path, the stem mount chamber having a depth extending from the upper surface of the base into the protrusion of the base, so that the second end lies inside the protrusion.

5. A fuel injector as set forth in claim 3, wherein the base of said head body has an upper surface opposed to the fitting surface, a through hole extending from the upper surface to the fitting surface, and a hollow cylindrical stem installed in the through hole, and wherein the stem has first and second ends opposed to each other, the first end being closed to define the diaphragm, the second end communicating with the branch path, and wherein the first end portion of said injector body has formed in the first end surface a recess communicating with the through hole of the base to define a stem mount chamber along with the through hole, and wherein the stem is disposed in the stem mount chamber and has a portion secured to the recess.

6. A fuel injector as set forth in claim 1, wherein the first end portion of said injector body has a first end surface comprising said joint surface and an extension extending around an edge of the first end surface, and wherein said head body includes a base with a fitting surface which is placed in surface abutment with the first end surface of said injector body and is partially so recessed as to be fitted to the extension of the injector body.

7. A fuel injector as set forth in claim 4, wherein the stem mount chamber has an internal thread, the stem having an external thread which engages the internal thread to install the stem in the head body.

8. A fuel injector as set forth in claim 5, wherein the recess of the injector body has an internal thread, the stem having an external thread which engages the internal thread to install the stem in the injector body.

9. A fuel injector as set forth in claim 1, wherein the first end portion of said injector body has a first end surface, a chamber formed in the first surface to have a given depth with an internal thread, and a branch path extending from a portion of the chamber to the fuel flow path, wherein said pressure sensor includes a hollow cylindrical stem installed in the chamber, the stem having first and second ends opposed to each other, the first end being closed to define the diaphragm, the second end opening into the branch path, wherein the head body includes a base which has a fitting surface shaped to be fitted to the first end surface of said injector body and a stem through hole formed through the fitting surface in coincidence with the chamber to define a stem mount chamber and wherein said stem is disposed in the stem mount chamber so that an upper end of the stem lies near an upper surface of the base which is opposed to the fitting surface.

10. A fuel injector as set forth in claim 1, wherein said head body is fastened to the injector body through a nut.

11. A fuel injector as set forth in claim 1, further comprising a plurality of terminals disposed above a surface of the base of the head body, the terminals being electrically insulated from each other and connected to conductors disposed in the base, and wherein the sensing device has conductive wires connected to the terminals.

12. A fuel injector comprising:
an injector body having a length with a first end portion and a second end portion at opposite ends thereof, said injector body also having a fuel inlet to which fuel is supplied externally from a common rail, a fuel flow path through which the fuel supplied to the fuel inlet flows, and a spray hole which is formed in the second end portion in communication with the fuel flow path and from which the fuel is sprayed;
a fuel pressure-sensing unit designed to be separate from said injector body, said fuel pressure-sensing unit being joined to a joint surface of the first end portion of said injector body and including a diaphragm which is formed to be separate from the injector body and which communicates with the fuel flow path in said injector body and a sensing device, the diaphragm being exposed to the fuel so as to be deformed as a function of a pressure of the fuel, the sensing device producing a signal as a function of a degree of deformation of the diaphragm; and
a nozzle needle which is movable in an axial direction of said injector body to open and close the spray hole selectively, an electric actuator working to control movement of said nozzle needle in the axial direction of said injector body.

13. A fuel injector as set forth in claim 12, wherein said fuel pressure-sensing includes an amplifier which works to amplify an electric output of the sensing device.

14. A fuel injector as set forth in claim 13, wherein said fuel pressure-sensing unit includes a bottomed hollow cylindrical stem which has first and second ends opposed to each other, the first end being closed by a bottom which defines the diaphragm, the second end communicating with the fuel flow path, and wherein the stem is installed in the first end portion of said injector body to retain said fuel pressure-sensing unit to said injector body.

15. A fuel injector as set forth in claim 1, wherein the joint surface of the first end portion is disposed at a first longitudinal end of the injector body.

16. A fuel injector as set forth in claim 1, wherein said joint surface is a planar surface oriented generally perpendicular to a longitudinal axis of the injector body.

17. A fuel injector as set forth in claim 1, wherein in a branch path in the injector body and a pressure sensing chamber in the head body communicates high-pressure fuel introduced into the fuel inlet path with the diaphragm so that the pressure of the high-pressure fuel is exerted on the diaphragm.

18. A fuel injector as set forth in claim 12, wherein the joint surface of the first end portion is disposed at a first longitudinal end of the injector body.

19. A fuel injector as set forth in claim 12, wherein said joint surface is a planar surface oriented generally perpendicular to a longitudinal axis of the injector body.

20. A fuel injector as set forth in claim 12, wherein in a branch path in the injector body and a pressure sensing chamber in the fuel pressure-sensing unit communicates high-pressure fuel introduced into the fuel inlet path with the diaphragm so that the pressure of the high-pressure fuel is exerted on the diaphragm.

* * * * *